United States Patent
Kim

(12) United States Patent (10) Patent No.: US 7,730,380 B2
Kim (45) Date of Patent: Jun. 1, 2010

(54) METHOD AND APPARATUS FOR TRANSMITTING/RECEIVING VOICE OVER INTERNET PROTOCOL PACKETS WITH A USER DATAGRAM PROTOCOL CHECKSUM IN A MOBILE COMMUNICATION SYSTEM

(75) Inventor: Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 11/199,280

(22) Filed: Aug. 9, 2005

(65) Prior Publication Data

US 2006/0039358 A1 Feb. 23, 2006

(30) Foreign Application Priority Data

Aug. 9, 2004 (KR) .................. 10-2004-0062544

(51) Int. Cl.
H03M 13/00 (2006.01)
(52) U.S. Cl. .................. 714/758; 370/389; 370/216; 370/254; 714/753
(58) Field of Classification Search ............ 370/216, 370/254, 255, 310, 389, 392, 395.52; 714/752, 714/753, 758
See application file for complete search history.

(56) References Cited

U.S. PATENT DOCUMENTS

| | | | | |
|---|---|---|---|---|
| 5,675,591 | A * | 10/1997 | Salzwedel et al. | 714/807 |
| 6,400,730 | B1 * | 6/2002 | Latif et al. | 370/466 |
| 6,542,521 | B1 * | 4/2003 | Fjørtoft et al. | 370/522 |
| 6,609,224 | B1 * | 8/2003 | Jonsson | 714/758 |
| 6,882,637 | B1 * | 4/2005 | Le et al. | 370/349 |
| 6,976,205 | B1 * | 12/2005 | Ziai et al. | 714/807 |
| 2001/0030963 | A1 * | 10/2001 | Yoshimura et al. | 370/393 |
| 2001/0043577 | A1 * | 11/2001 | Barany et al. | 370/328 |
| 2002/0097701 | A1 * | 7/2002 | Lupien et al. | 370/338 |
| 2003/0035441 | A1 * | 2/2003 | Cheng et al. | 370/474 |
| 2003/0095567 | A1 * | 5/2003 | Lo et al. | 370/466 |

(Continued)

FOREIGN PATENT DOCUMENTS

WO WO-01/58074 A2 8/2001

(Continued)

OTHER PUBLICATIONS

Jonsson et al., *Robust Checksum-based Header Compression*, Mar. 10, 2000, IETF.org.

(Continued)

*Primary Examiner*—Steven H Nguyen
*Assistant Examiner*—Curtis A Alia
(74) *Attorney, Agent, or Firm*—Roylance, Abrams, Berdo & Goodman, LLP

(57) ABSTRACT

A method and apparatus for transmitting/receiving a Voice over Internet Protocol (VoIP) packet on a radio link in a mobile communication system which provides a voice service over a packet network connected to the Internet. To transmit a VoIP packet, a VoIP packet comprising a user datagram protocol (UDP) checksum field is received, the UDP checksum field is eliminated from the received VoIP packet, a cyclic redundancy check (CRC) is added to the UDP checksum field-free VoIP packet, for error detection in the radio link, and the VoIP packet having the CRC is transmitted on the radio link.

18 Claims, 8 Drawing Sheets

U.S. PATENT DOCUMENTS

| | | | |
|---|---|---|---|
| 2003/0133408 A1* | 7/2003 | Cheng et al. | 370/230 |
| 2003/0165230 A1* | 9/2003 | Reuss | 379/265.02 |
| 2004/0010729 A1* | 1/2004 | Lockridge et al. | 713/500 |
| 2004/0037317 A1* | 2/2004 | Zalitzky et al. | 370/466 |
| 2004/0073711 A1* | 4/2004 | Pelletier et al. | 709/247 |
| 2004/0095939 A1* | 5/2004 | Yang | 370/395.52 |
| 2005/0027329 A1* | 2/2005 | Holmquist et al. | 607/60 |
| 2005/0238008 A1* | 10/2005 | Fraser | 370/389 |

FOREIGN PATENT DOCUMENTS

| | | |
|---|---|---|
| WO | WO-02/25442 A1 | 3/2002 |
| WO | WO-02/093865 A2 | 11/2002 |

OTHER PUBLICATIONS

Pelletier, *Robust Header Compression (ROHC); Profiles for UDP Lite*, Feb. 22, 2002, IETF.org.

Koren, *Enhanced Compressed RTP (CRTP )for Links with High Delay, Packet Loss and Reordering*, Jul. 2003, IEFT.org.

* cited by examiner

METHOD AND APPARATUS FOR TRANSMITTING/RECEIVING VOICE OVER INTERNET PROTOCOL PACKETS WITH A USER DATAGRAM PROTOCOL CHECKSUM IN A MOBILE COMMUNICATION SYSTEM

PRIORITY

This application claims the benefit under 35 U.S.C. §119 (a) to an application entitled "Method And Apparatus For Transmitting/Receiving Voice Over Internet Protocol Packet With User Datagram Protocol Checksum In A Mobile Communication System" filed in the Korean Intellectual Property Office on Aug. 9, 2004 and assigned Serial No. 2004-62544, the entire contents of which are hereby incorporated by reference.

BACKGROUND OF THE INVENTION

1. Field of the Invention

The present invention relates generally to a mobile communication system that interacts with the Internet. In particular, the present invention relates to a method and apparatus for efficiently processing a User Datagram Protocol (UDP) Checksum field when a UDP packet is transmitted on a radio channel.

2. Description of the Related Art

Today's mobile communication technology has evolved from a traditional voice service into a high-speed, high-quality wireless data packet communication system. A $3^{rd}$ generation mobile communication system such as a Universal Mobile Telecommunication Service (UMTS) is based on Global System for Mobile communication (GSM) and General Packet Radio Services (GPRS). It provides a uniform service that transmits packetized text, digital audio and video, and multimedia data at a 2 Mbps or higher rate to mobile subscribers or computer users around the world. With the introduction of the concept of packet-switched access using a packet protocol like Internet Protocol (IP), UMTS allows access to any end point in a network at any time.

The $3^{rd}$ Generation Partnership Project (3GPP), in charge of standardizing the UMTS communication system, has discussed support for Voice over Internet Protocol (VoIP) communications. VoIP is a communication technique in which a voice frame generated from a CODEC (Coder-Decoder) is converted to an IP/User Datagram Protocol (UDP)/Realtime Transport Protocol (RTP) packet, for transmission. Thus, VoIP provides a voice service over a packet network.

FIG. 1 illustrates the configuration of a VoIP-enabled User Equipment (UE) in a conventional mobile communication system.

Referring to FIG. 1, a VoIP-enabled UE 100 comprises a CODEC 106 for converting human voice to a voice frame, an IP/UDP/RTP layer 105 for converting the voice frame to an IP/UDP/RTP packet, a Packet Data Convergence Protocol (PDCP) layer 104 for compressing the header of the IP/UDP/RTP packet, a Radio Link Control (RLC) layer 103 for converting the IP/UDP/RTP packet to a form suitable for transmission on a radio channel, a Medium Access Control (MAC) layer 102, and a Physical PHY layer 101 for transmitting the packet data on the radio channel.

The voice packet data from the UE 100 is delivered to a Radio Network Controller (RNC) 120 via a Node B 110. Like the UE 100, the RNC 120 has a MAC layer 122, a RLC layer 123, and a PDCP layer 124. The RNC 120 converts the received data to the original IP/UDP/RTP packet and transmits it to a Core Network (CN) 130. The IP/UDP/RTP packet is transmitted to the other party over an IP network 140. The UE of the other party processes the voice data in the reverse order of the above-described operation and provides the voice data to the other party.

Now, a description is made of the functionalities of the RLC layer.

Typically, the RLC layer operates in one of three ways: unacknowledged mode (UM), acknowledged mode (AM), and transparent mode (TM). VoIP is expected to operate in the RLC UM mode.

In a transmitter, a RLC UM entity generates a RLC Protocol Data Unit (PDU) by segmenting, concatenating, or padding a RLC Service Data Unit (SDU) received from a higher layer to a size suitable for transmission on a radio channel and then inserts information about the segmentation/concatenation/padding and a Serial Number (SN) into the resulting data. The RLC PDU is delivered to a lower layer. A RLC UM entity in a receiver recovers the RLC SDU by interpreting the SN and the segmentation/concatenation/padding information of the RLC PDU received from its lower layer. For reference, in the TM mode, the RLC entity simply delivers an RLC SDU received from the higher layer to the lower layer and a RLC PDU received from the lower layer to the higher layer.

The MAC layer serves as an interface between the RLC layer and the PHY layer. It inserts a MAC header into the RLC PDU. Data that the MAC layer delivers to the PHY layer is called a Transport Block (TB).

The PHY layer processes the TB and transmits/receives the TB on a radio channel. The PHY layer also inserts a Cyclic Redundancy Check (CRC) to the TB for transmission and performs an error check on received data using a CRC.

As described above, the voice data generated from the CODEC 106 of the UE 110 is converted to a VoIP packet by the IP/UDP/RTP stack 105. The header of the VoIP packet is compressed in the PDCP layer 104 configured for uplink transmission, processed to a size suitable for transmission on a radio channel in the RLC layer 103, and reconstructed to an RLC PDU in the MAC and PHY layers 102 and 101. The RLC PDU is channel-encoded and then transmitted on the radio channel. In the Node B 110, the RLC PDU or a TB resulting from processing the RLC PDU in the PHY layer is channel-decoded in a PHY layer 111 and then transmitted to the RNC 120. The RNC 120 recovers the RLC PDU to the VoIP packet and transmits it to the CN 130. The CN 130 transmits the VoIP packet to the other party via the IP network 140 or a Public-Switched Telephone Network (PSTN) 150. Downlink data transmission is performed in the reverse order.

For VoIP communications, both the caller and the called party must use the same type of CODECs 106 and 144. If the UE 100 operating in UMTS communicates with a standard landline phone, a specific device between the PSTN 150 and the UMTS CN 130 performs CODEC conversion for the CODEC 154.

CODECs approved by the 3GPP include an Adaptive Multi-Rate (AMR) CODEC. The AMR CODEC is characterized by Unequal Error Protection/Unequal Error Detection (UEP/UED).

The structure of a VoIP packet for transmission on a radio channel will be described in detail.

Referring to FIG. 1, a VoIP packet 160 is comprised of a Radio Protocol (RP) header 161, a Robust Header Compression (ROHC) header 162, a UDP checksum 163, a Payload 164, and a CRC 165 inserted in the PHY layer. The RP header 161 is inserted in the PDCP, RLC and MAC layers. Since a PDCP header and a MAC header are not used in many cases in VoIP communications, the RP header 161 can be a 2-3 byte RLC header.

The ROHC header 162 is a header compressed by a header compression protocol called ROHC in the PDCP layer. Compressible parts of an IP/UDP/RTP header are converted to the ROHC header. The ROHC header 162 is variable in size, generally 2 to 3 bytes.

The UDP header comprises the UDP checksum 163. The UDP checksum 163 is not compressed and positioned after the ROHC header 162. Errors are detected from IP/UDP/RTP data by means of the UDP checksum 163 of about 2 bytes.

The Payload 164 is the data generated from the CODEC. In the case of the AMR CODEC, the Payload 164 is 32 bytes or 9 bytes. The CRC 165, inserted in the PHY layer, is a CRC operation value for the entire packet. The size of the CRC 165 is determined on a per call basis. It is usually 12 bits or 16 bits. The PHY layer of the receiver performs an error check using the CRC 165.

As described above, two error detection schemes, that is, the UDP checksum 163 and the CRC 165 are redundantly applied to the conventional VoIP packet 160 in order to detect errors from the VoIP packet 160 transmitted on the radio channel, resulting in an unnecessary overhead.

SUMMARY OF THE INVENTION

An exemplary object of the present invention is to substantially solve at least the above problems and/or disadvantages and to provide at least the advantages below. Accordingly, an exemplary object of the present invention is to provide a method and apparatus for efficiently using transmission resources by eliminating a User Datagram Protocol (UDP) Checksum field from a Voice over Internet Protocol (VoIP) packet on a radio link that provides an error detection function.

Another exemplary object of the present invention is to provide a method and apparatus for eliminating/attaching a UDP Checksum field from/to a VoIP packet between a Packet Data Convergence Protocol (PDCP) layer and a Radio Link Control (RLC) layer.

The above exemplary objects are achieved by providing a method and apparatus for transmitting/receiving a VoIP packet on a radio link in a mobile communication system.

According to one exemplary aspect of the present invention, in a method of transmitting a VoIP packet on a radio link in a mobile communication system which provides a voice service over a packet network connected to the Internet, a VoIP packet comprising a UDP checksum field is received, the UDP checksum field is eliminated from the received VoIP packet, a CRC is added to the UDP checksum field-free VoIP packet, for error detection in the radio link, and the VoIP packet having the CRC is transmitted on the radio link.

According to another exemplary aspect of the present invention, in a method of receiving a VoIP packet on a radio link in a mobile communication system which provides a voice service over a packet network connected to the Internet, a VoIP packet without a UDP checksum field is received on a radio link, and the UDP checksum field is recovered for the received VoIP packet.

According to a further exemplary aspect of the present invention, in an apparatus for transmitting a VoIP packet on a radio link in a mobile communication system which provides a voice service over a packet network connected to the Internet, a checksum inserter receives a VoIP packet comprising a UDP checksum field and replaces a UDP checksum in a UDP checksum field of the VoIP packet with a pseudo checksum preset between a transmitter and a receiver. A header compressor compresses a header of the VoIP packet having the pseudo checksum. A checksum deleter eliminates the UDP checksum field from the header-compressed VoIP packet. A RP transmitter adds a CRC to the UDP checksum field-free VoIP packet, for error detection in the radio link, and transmits the VoIP packet having the CRC on the radio link.

According to still another exemplary aspect of the present invention, in an apparatus for receiving a VoIP packet on a radio link in a mobile communication system which provides a voice service over a packet network connected to the Internet, a RP receiver receives a VoIP packet without a UDP checksum field on a radio link. A checksum inserter inserts a pseudo checksum preset between a transmitter and a receiver into the received VoIP packet. A header decompressor decompresses a header of the VoIP packet with the pseudo checksum. A checksum calculator calculates a UDP checksum for the header-decompressed VoIP packet and replaces the pseudo checksum with the calculated UDP checksum.

BRIEF DESCRIPTION OF THE DRAWINGS

The above and other objects, features and advantages of the present invention will become more apparent from the following detailed description when taken in conjunction with the accompanying drawings in which.

Throughout the drawings, the same or similar elements, features and structures are represented by the same reference numerals.

DETAILED DESCRIPTION OF EXEMPLARY EMBODIMENTS

Exemplary embodiments of the present invention will be described herein below with reference to the accompanying drawings. In the following description, well-known functions or constructions are not described for conciseness.

The exemplary embodiments of the present invention are intended to provide a method of eliminating a User Datagram Protocol (UDP) checksum from a Voice over Internet Protocol (VoIP) packet for transmission on a radio channel that provides an error detection function and calculating the UDP checksum at a receiver that receives the radio channel. For example, a UE eliminates a UDP Checksum field from a VoIP packet prior to transmission. An RNC recovers the VoIP packet, calculates a UDP checksum, and inserts it into the VoIP packet. If the VoIP packet has errors on the radio channel, the errors are detected by a CRC in the PHY layer. Therefore, the elimination of the UDP checksum from the VoIP packet scarcely leads to error detection failure.

Figure 1:
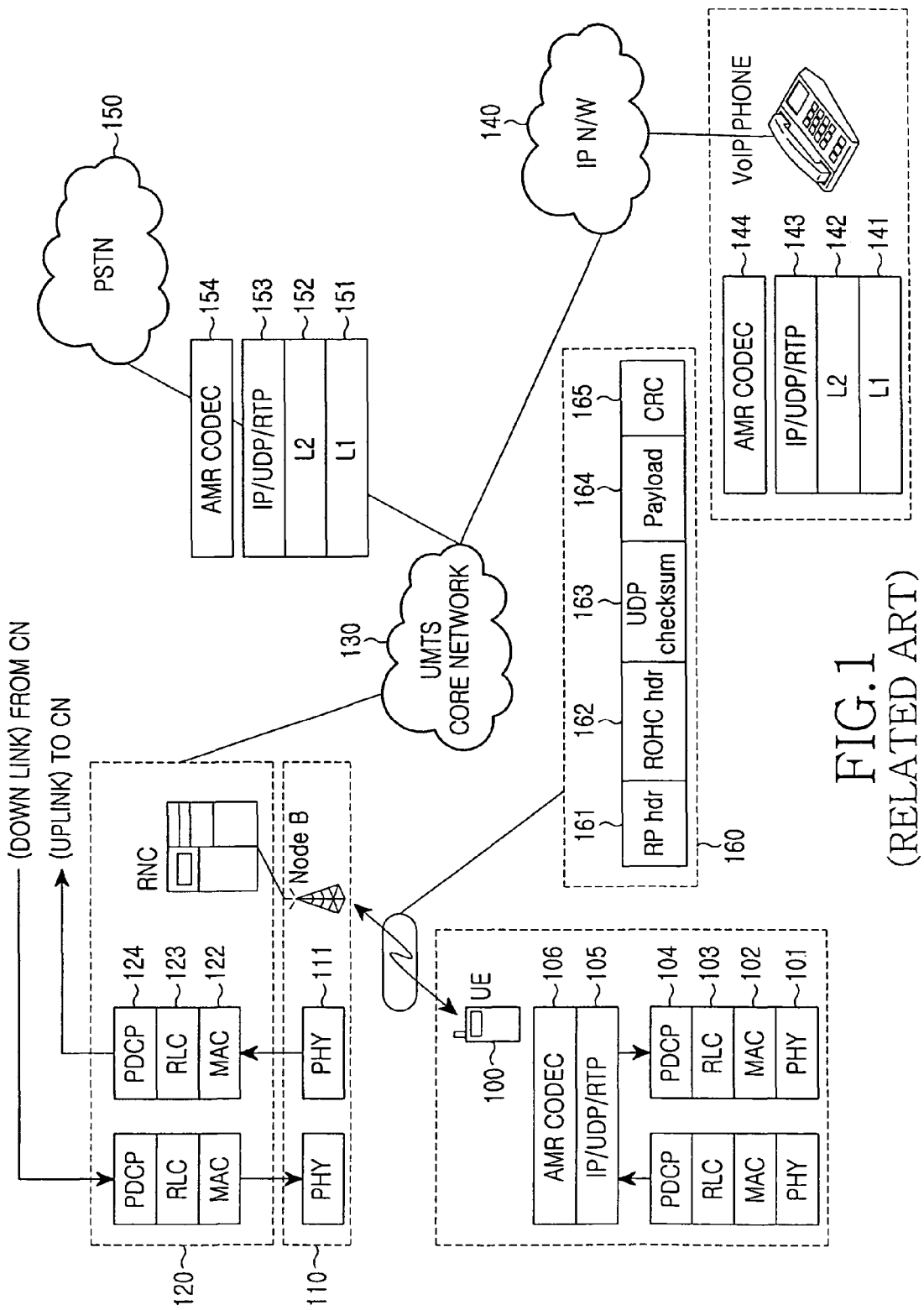
FIG. 1 illustrates an operation for providing a Voice over Internet Protocol (VoIP) service in a conventional mobile communication system.
Figure 2:
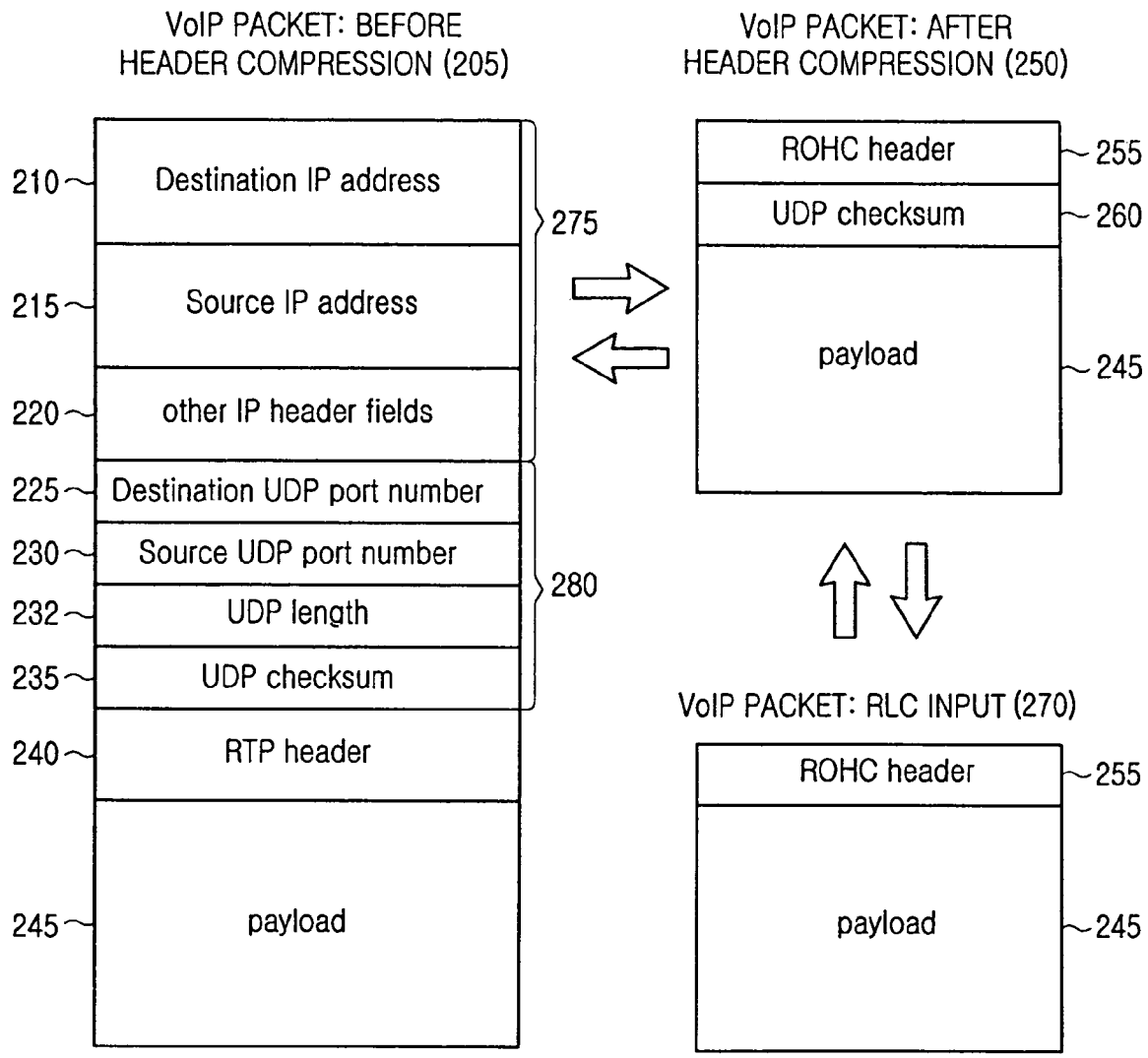
FIG. 2 illustrates transmission and reception of an exemplary VoIP packet according to an exemplary embodiment of the present invention.

With reference to FIG. 2, a comprehensive description will be made of a procedure for eliminating/attaching a UDP Checksum field from/to a VoIP packet between the PDCP layer and the RLC layer according to the present invention.

FIG. 2 illustrates transmission and reception of a VoIP packet according to a preferred embodiment of the present invention.

Referring to FIG. 2, reference numeral 205 denotes a VoIP packet before header compression, generated from the CODEC in the UE or received from the core network (CN), and reference numeral 250 denotes a VoIP packet having a header compressed in the PDCP layer (hereinafter, referred to as a header-compressed VoIP packet). Reference numeral 270 denotes a VoIP packet (hereinafter, referred to as a transmission VoIP packet) produced by eliminating a UDP Checksum 260 from the header-compressed VoIP packet 250 and then transmitted through the Radio Link Control (RLC), Medium Access Control (MAC) and PHY layers.

Regarding the VoIP packet 205 before header compression, it comprises an IP Header 275, a UDP Header 280, a Realtime Transport Protocol (RTP) Header 240, and a Payload 245.

The IP Header 275 comprises a Destination IP Address 210, a Source IP Address 215, and other IP Header fields 220. The Destination IP Address 210 indicates the IP address of a final destination for the VoIP packet 205. The Source IP Address 215 is the IP address of a node that has generated the VoIP packet 205. In IPv6, the Destination IP Address 210 and the Source IP Address 215 each have a length of 16 bytes, for example. The other IP Header fields 220 comprise information about a protocol version, the protocol number of a higher layer, a flow ID, and so on. The protocol number of the higher layer indicates the type of protocol used in the transport layer above the IP layer. The protocol number of the higher layer is UDP in the VoIP service.

The UDP Header 280 comprises a Destination UDP Port Number 225, a Source UDP Port Number 230, a UDP Length 232, and a UDP Checksum 235. The Destination UDP Port Number 225 is a 2-byte logical identifier (ID) assigned to a specific application (or a specific higher layer) in a node, indicating the higher layer to which the VoIP packet is destined. The Source UDP Port Number 230 indicates a higher layer from which the VoIP packet has been generated. The UDP Length 232 indicates the length of a packet within the UDP Header 280. The UDP Checksum 235 is a checksum for detecting errors in an IP Pseudo Header, the UDP Header 280, the RTP Header 240, and the Payload 245. It is 2 bytes long. The IP Pseudo Header refers to the Destination IP Address 210, the Source IP Address 215, and the protocol number of a higher layer in the IP Header 275.

The RTP Header 240 is 8 bytes long and provides information needed for real-time traffic recovery, such as a SN and a Time Stamp (TS). The Payload 245 comprises the voice data generated from the CODEC.

Regarding the header-compressed VoIP packet 250, it is comprised of a ROHC header 255, a UDP Checksum 260, and a Payload 245. While the ROHC header 255 is variable in configuration and size depending on header compression status, it typically comprises a Connection ID (CID), a SN, and a CRC. The CID identifies a context having header compression-related information, and the SN is the last few bits of the SN of the RTP header 240. The CRC is calculated over the IP/UDP/RTP headers which are not yet compressed. It is optionally included in the ROHC header 255 to verify that header decompression is correct.

In the header compression, "fixed header field values" such as the IP addresses and the UDP port numbers are stored in the context and not transmitted. "Sometimes changing header field values" are transmitted whenever they are changed. For "regularly changing header field values" such as the RTP SN, estimates of their changes are transmitted. "Always irregularly changing header field values" are transmitted all the time. Since the UDP Checksum field has an always irregularly changing value, a UDP checksum is transmitted without compression.

The transmission VoIP packet 270 is constructed by eliminating the UDP Checksum field 260 from the header-compressed VoIP packet 250. Thus, it comprises the ROHC header 255 and the Payload 245.

The receiver receives the transmission VoIP packet 270 and re-inserts the UDP Checksum field into it. Because the receiver has no knowledge of the true value of the UDP checksum eliminated by the transmitter, a header decompressor determines whether header decompression is correct using the CRC of the ROHC header, as described before. In case the receiver inserts an arbitrary UDP checksum, the CRC check will fail, which implies header decompression failure.

To overcome the problem, a pseudo UDP checksum preset between the transmitter and the receiver is filled in the UDP Checksum field before header compression of a VoIP packet in an embodiment of the present invention. The pseudo UDP checksum does not affect the header decompression irrespective of its value. It can be, for example, '1010 1010 1010 1010'.

Upon generation of the VoIP packet 205, the transmitter fills the pseudo UDP check sum '1010 1010 1010 1010' in the UDP Checksum field 235 and compresses the IP/UDP/RTP header, thereby creating the header-compressed VoIP packet 250. Thus, the UDP Checksum field 260 of the header-compressed VoIP packet 250 has the value '1010 1010 1010 1010'. The transmitter eliminates the UDP Checksum field 260 from the header-compressed VoIP packet 250 and transmits the resulting transmission VoIP packet 270 to the receiver.

The receiver recovers the header-compressed VoIP packet 250 by inserting '1010 1010 1010 1010' as the UDP Checksum field 260 in the transmission VoIP packet 270, and decompresses the header of the header-compressed VoIP packet 250. The receiver calculates the UDP checksum of the decompressed VoIP packet 205, neglecting the pseudo UDP checksum, and then inserts the calculated UDP checksum into the UDP Checksum field 235, thereby recovering the original VoIP packet 205.

In this manner, the use of the pseudo UDP checksum eliminates the need for transmitting a UDP Checksum field on a radio channel.

The transmission and reception operations of the UE and the RNC according to an embodiment of the present invention will now be described below with reference to FIG. 3.

Figure 3:
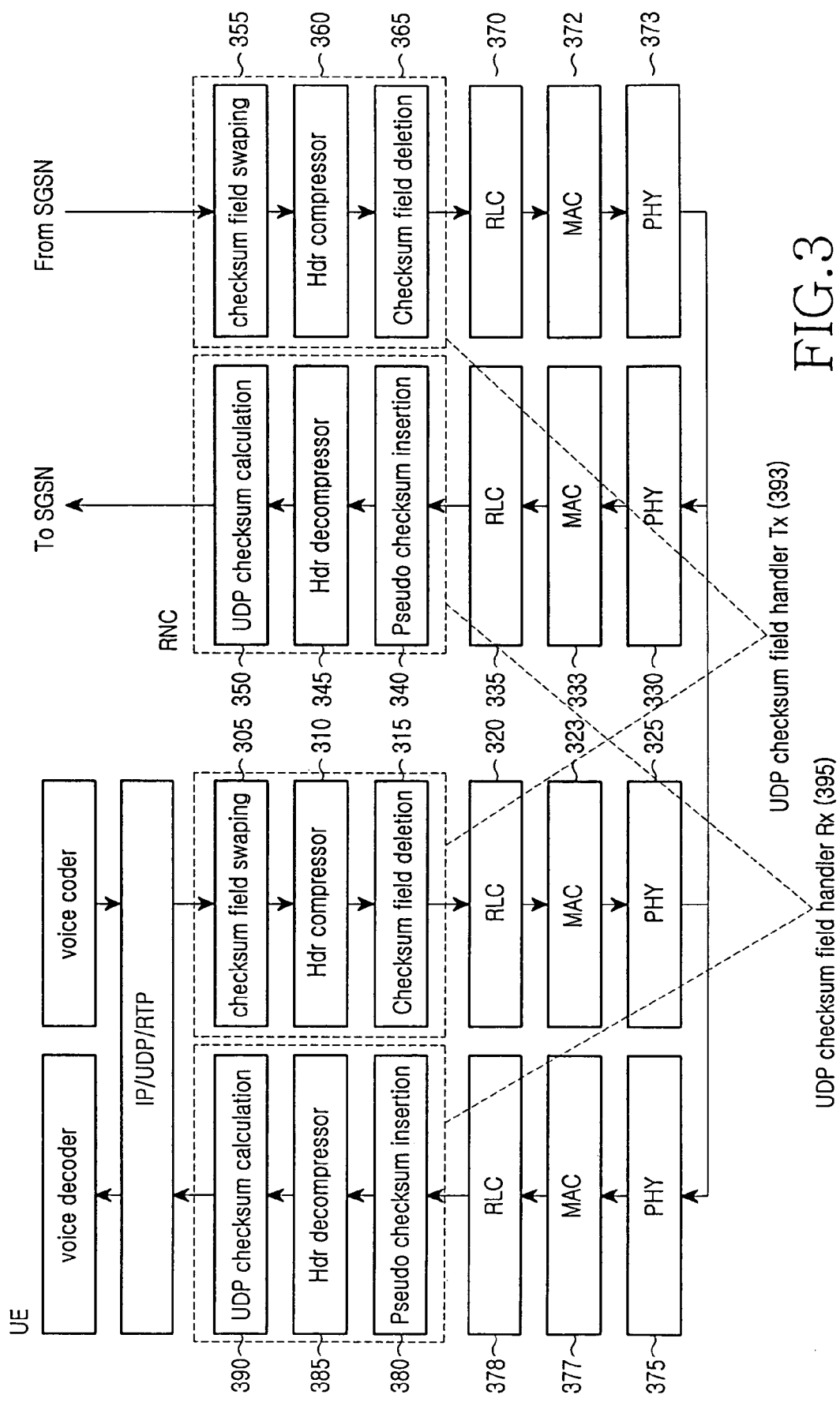
FIG. 3 illustrates an exemplary structure of a user equipment (UE) and a Radio Network Controller (RNC) according to an exemplary embodiment of the present invention.

FIG. 3 illustrates exemplary structures of the UE and the RNC according to an exemplary embodiment of the present invention.

Both the UE and the RNC perform transmission and reception. That is, the UE transmits on the uplink and receives on the downlink, while the RNC receives on the uplink and transmits on the downlink. The transmission operation is the process of receiving an IP/UDP/RTP packet from a higher layer, setting a pseudo UDP checksum in the UDP Checksum field of the IP/UDP/RTP packet, compressing an IP/UDP/RTP header, and eliminating the UDP Checksum field with the pseudo UDP checksum. The reception operation is the process of receiving the header-compressed IP/UDP/RTP packet from a lower layer, inserting the pseudo UDP checksum in the UDP Checksum field behind the ROHC header, decompressing the IP/UDP/RTP header, calculating the UDP checksum of the decompressed header and the payload, and inserting the calculated UDP checksum into the UDP Checksum field of the decompressed IP/UDP/RTP header.

Referring to FIG. 3, a checksum field swapper 305 and 355, a header compressor 310 and 360, and a checksum field deleter 315 and 365 collectively form a UDP checksum field transmission handler 393 for the UE and the RNC.

During transmission, the checksum field swapper 305 and 355 substitutes a pseudo UDP checksum for a UDP checksum, the header compressor 310 and 360 compresses an IP/UDP/RTP header, and the checksum field deleter 315 and 365 deletes the pseudo checksum.

A pseudo checksum inserter 380 and 340, a header decompressor 385 and 345, and a UDP checksum calculator 390 and 350 collectively form a UDP checksum field reception handler 395 for the UE and the RNC.

During reception, the pseudo checksum inserter 380 and 340 inserts a pseudo checksum in a receive packet, the header decompressor 385 and 345 decompresses a header, and the UDP checksum calculator 390 and 340 substitutes a true checksum for the pseudo checksum. The header compressors 310 and 360, and the header decompressors 385 and 345 are provided with a typical header compression protocol such as ROHC and reside in, for example, the PDCP layer.

The UE is provided with the UDP checksum field transmission handler 393 for uplink transmission, and the UDP checksum field reception handler 395 for downlink reception. The UE also has RLC entities 378 and 320, MAC entities 377 and 323, and PHY entities 375 and 325, for both the uplink and the downlink operations.

The RNC is provided with the UDP checksum field transmission handler 393 for downlink transmission, and the UDP checksum field reception handler 395 for uplink reception. The RNC also has RLC entities 335 and 370, MAC entities 333 and 372, and PHY entities 330 and 373, for both the uplink and the downlink operations.

Figure 4:
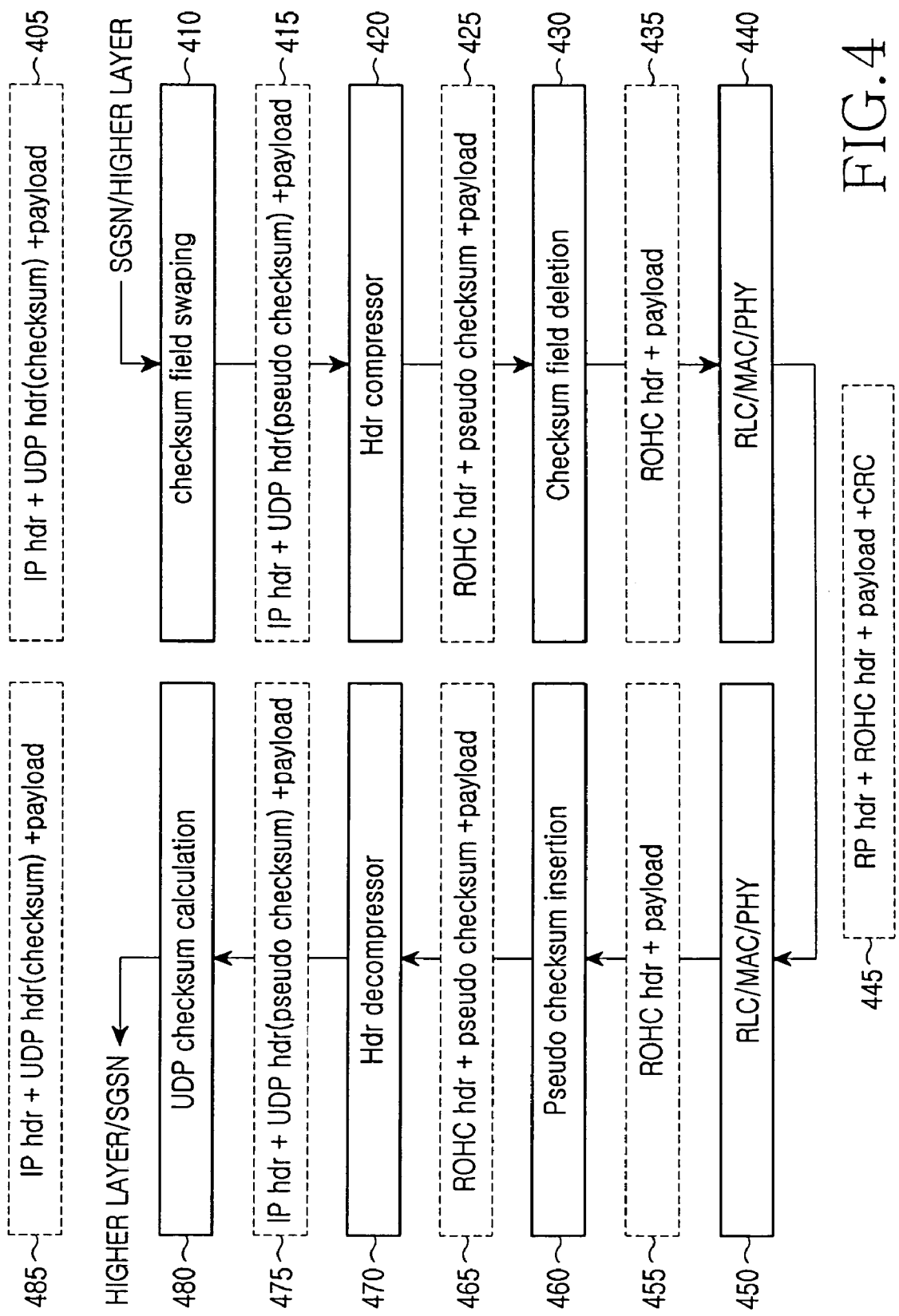
FIG. 4 illustrates exemplary operations of a User Datagram Protocol (UDP) checksum field transmission handler and a UDP checksum field reception handler according to an exemplary embodiment of the present invention.

FIG. 4 illustrates exemplary operations of the UDP checksum field transmission handler and the UDP checksum field reception handler according to an exemplary embodiment of the present invention. These operations will be described in the context of both the UE and the RNC.

Referring to FIG. 4, a checksum field swapper 410 receives a VoIP packet 405 from a Serving GPRS Support Node (SGSN) if it is in the RNC and from a higher layer if it is in the UE. The VoIP packet 405 is comprised of an IP Header, a UDP Header with a UDP Checksum field, and a Payload. The checksum field swapper 410 replaces the UDP checksum of the UDP header with a predetermined pseudo checksum in the VoIP packet 405, thereby producing a pseudo VoIP packet 415. The pseudo VoIP packet 415 is comprised of the IP Header, the UDP Header with the pseudo checksum, and the Payload.

A header compressor 420 compresses the IP Header, the UDP Header, and the RTP Header. Thus, the header-compressed VoIP packet 425 is comprised of an ROHC Header, the pseudo checksum, and the Payload. The header compression is a conventional ROHC header compression.

A checksum field deleter 430 eliminates the UDP Checksum field with the pseudo checksum from the header-compressed VoIP packet 425, thereby producing a checksum-free VoIP packet 435. The checksum-free VoIP packet 435 is comprised of the ROHC header and the Payload.

The checksum-free VoIP packet 435 is transmitted through RLC/MAC/PHY layers 440. The VoIP packet 445 transmitted on the radio channel comprises an RP Header, the ROHC header, the Payload, and a CRC.

In the receiver, RLC/MAC/PHY layers 450 processes the checksum-free VoIP packet 445 and reconstructs an RP-free VoIP packet 455 by eliminating the RP header from the checksum-free VoIP packet 445. The RP-free VoIP packet 455 is comprised of the ROHC header and the Payload.

A pseudo checksum inserter 460 inserts the pseudo checksum into the RP-free VoIP packet 455, thus constructing a pseudo-checksum VoIP packet 465. The pseudo-checksum VoIP packet 465 comprises the ROHC header, the pseudo checksum, and the Payload. The pseudo checksum is identical or substantially identical to that used in the checksum field swapper 410. The transmitter and the receiver can preset the value of the pseudo checksum at a call setup, and the same pseudo checksum can be applied to all calls.

A header decompressor 470 decompresses the header of the pseudo-checksum VoIP packet 465, thus reconstructing a header-decompressed VoIP packet 475. The header-decompressed VoIP packet 475 is comprised of the original IP, UDP, and RTP headers, the pseudo checksum being set in the UDP Checksum field of UDP header.

A UDP checksum calculator 480 calculates the UDP checksum of the VoIP packet 475 in the same manner as done by UDP and replaces the pseudo checksum with the resulting UDP checksum, thereby constructing a VoIP packet 485. The VoIP packet 485 has the UDP checksum of the IP Header, the UDP Header, and the Payload in the UDP Checksum field. If the receiver is the UE, the UE delivers the VoIP packet 485 to the higher layer, and if the receiver is the RNC, the RNC delivers the VoIP packet 485 to the SGSN.

With the header compression illustrated in FIG. 4, the UDP Checksum field is not transmitted on a radio channel. As a result, 2 bytes per packet are saved.

Aside from the UDP, UDP-lite can be used as the transport protocol of VoIP communications. This exemplary embodiment of the present invention is also applicable to UDP-lite.

In UDP-lite, UDP checksum coverage information is filled in the UDP Header Length field, and the UDP checksum of a part indicated by the UDP checksum coverage is set in the UDP Checksum field. This exemplary embodiment of the present invention is implemented for UDP-lite in the same manner as for UDP, except that the UDP checksum calculator calculates the UDP checksum in the manner defined by UDP-lite. That is, the UDP checksum calculator 480 calculates a checksum referring to the UDP checksum coverage information of the header-decompressed VoIP packet 475 and sets the checksum in the UDP Checksum field.

With reference to FIGS. 5 through 8, the PDCP layer operations of the UE and the RNC on the uplink and downlink according to an embodiment of the present invention will be described below.

Figure 5:
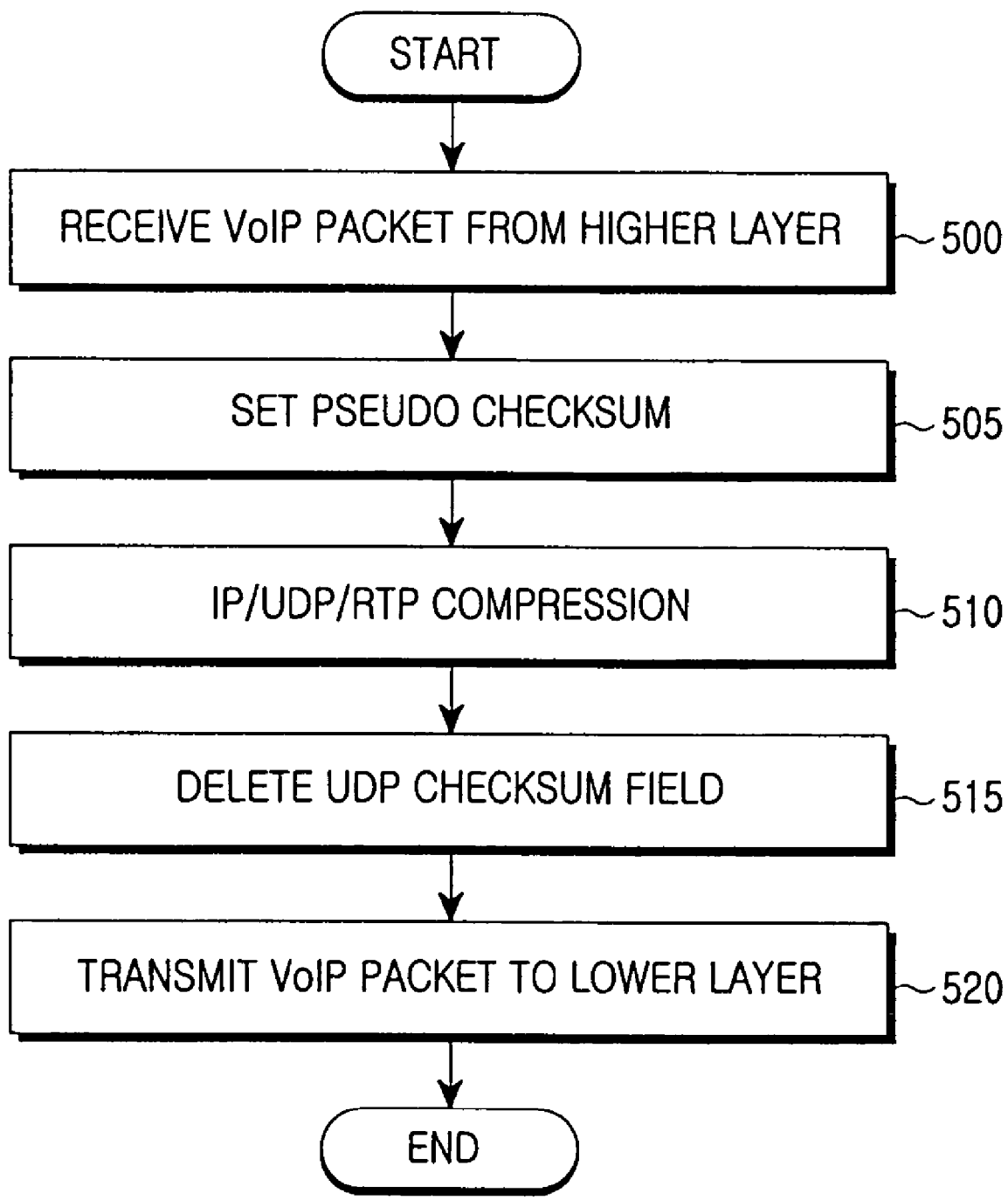
FIG. 5 is a flowchart illustrating an exemplary Packet Data Convergence Protocol (PDCP) layer operation of the UE for uplink VoIP packet transmission according to an exemplary embodiment of the present invention.

FIG. 5 is a flowchart illustrating an exemplary PDCP layer operation of the UE for the uplink transmission according to an exemplary embodiment of the present invention.

Referring to FIG. 5, the UE receives a VoIP packet from the higher layer in step 500.

In step 505, the UE replaces the checksum of the VoIP packet with a predetermined pseudo checksum. The UE then compresses the IP/UDP/RTP header of the resulting VoIP packet in step 510, eliminates the UDP checksum field from the header-compressed VoIP packet in step 515, and delivers the UDP checksum-free VoIP packet to the lower layer in step 520.

Figure 6:
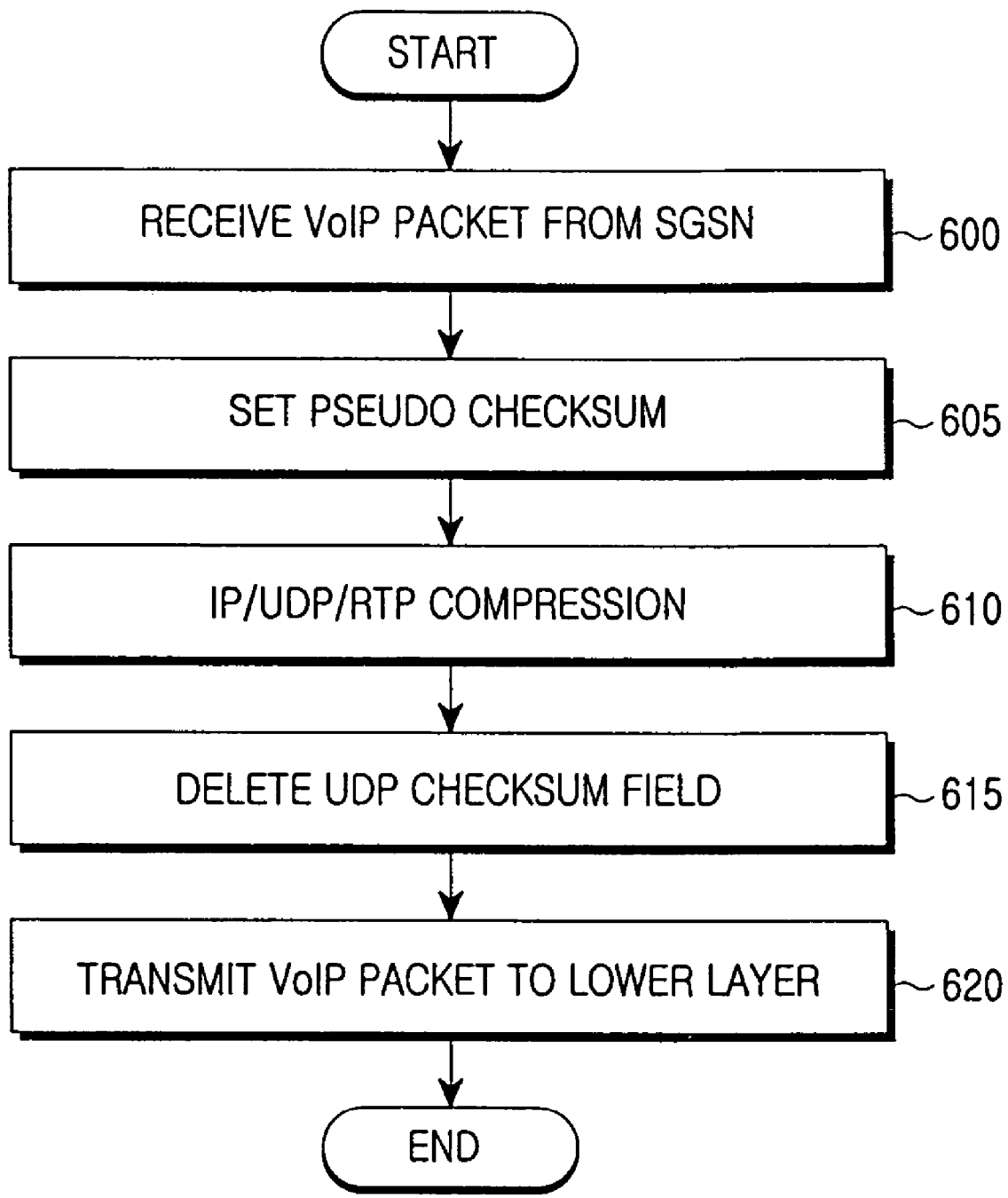
FIG. 6 is a flowchart illustrating an exemplary PDCP layer operation of the RNC for downlink VoIP packet transmission according to an exemplary embodiment of the present invention.

FIG. 6 is a flowchart illustrating an exemplary PDCP layer operation of the RNC for the downlink transmission according to an exemplary embodiment of the present invention.

Referring to FIG. 6, the RNC receives a VoIP packet from the SGSN in step 600.

In step 605, the RNC replaces the checksum of the VoIP packet with a predetermined pseudo checksum. Thus, the VoIP packet is comprised of an IP Header, a UDP Header with the pseudo checksum, and a Payload.

The RNC then compresses the IP/UDP/RTP header of the resulting VoIP packet in step 610, eliminates the UDP Checksum field from the header-compressed VoIP packet in step 615, and delivers the UDP checksum-free VoIP packet to the lower layer in step 620.

Figure 7:
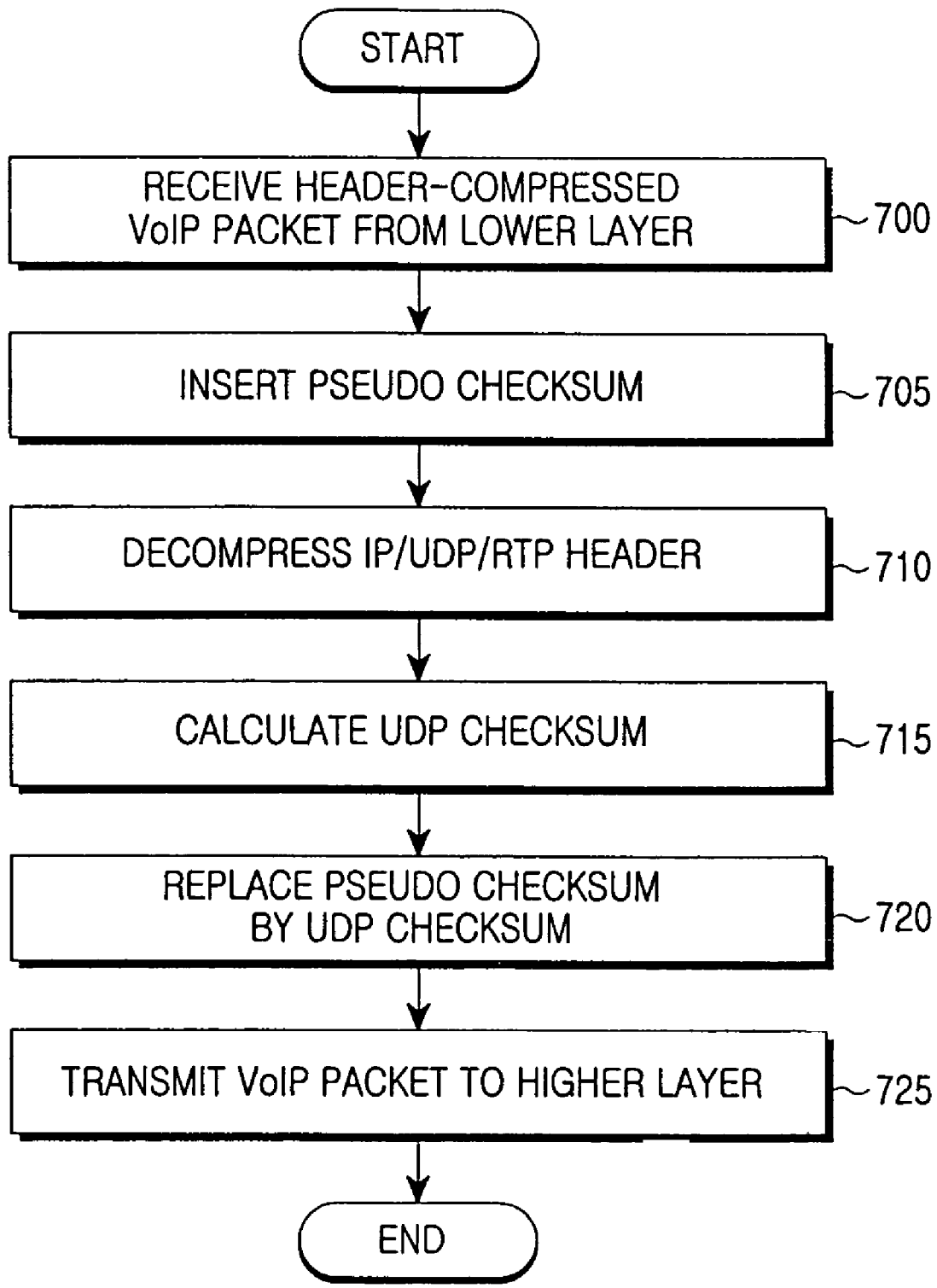
FIG. 7 is a flowchart illustrating an exemplary PDCP layer operation of the UE for downlink VoIP packet reception according to an exemplary embodiment of the present invention.

FIG. 7 is a flowchart illustrating an exemplary PDCP layer operation of the UE for the downlink reception according to an exemplary embodiment of the present invention.

Referring to FIG. 7, the UE receives a header-compressed VoIP packet from the lower layer in step 700. In step 705, the UE inserts a predetermined pseudo checksum into the VoIP packet. The UE then decompresses the IP/UDP/RTP header of the VoIP packet with the pseudo checksum in step 710.

In step 715, the UE calculates the UDP checksum of the header-decompressed VoIP packet in the same manner as done by UDP. The UE substitutes the UDP checksum for the pseudo checksum in the header-decompressed VoIP packet in step 720 and delivers the resulting VoIP packet to the higher layer in step 725.

Figure 8:
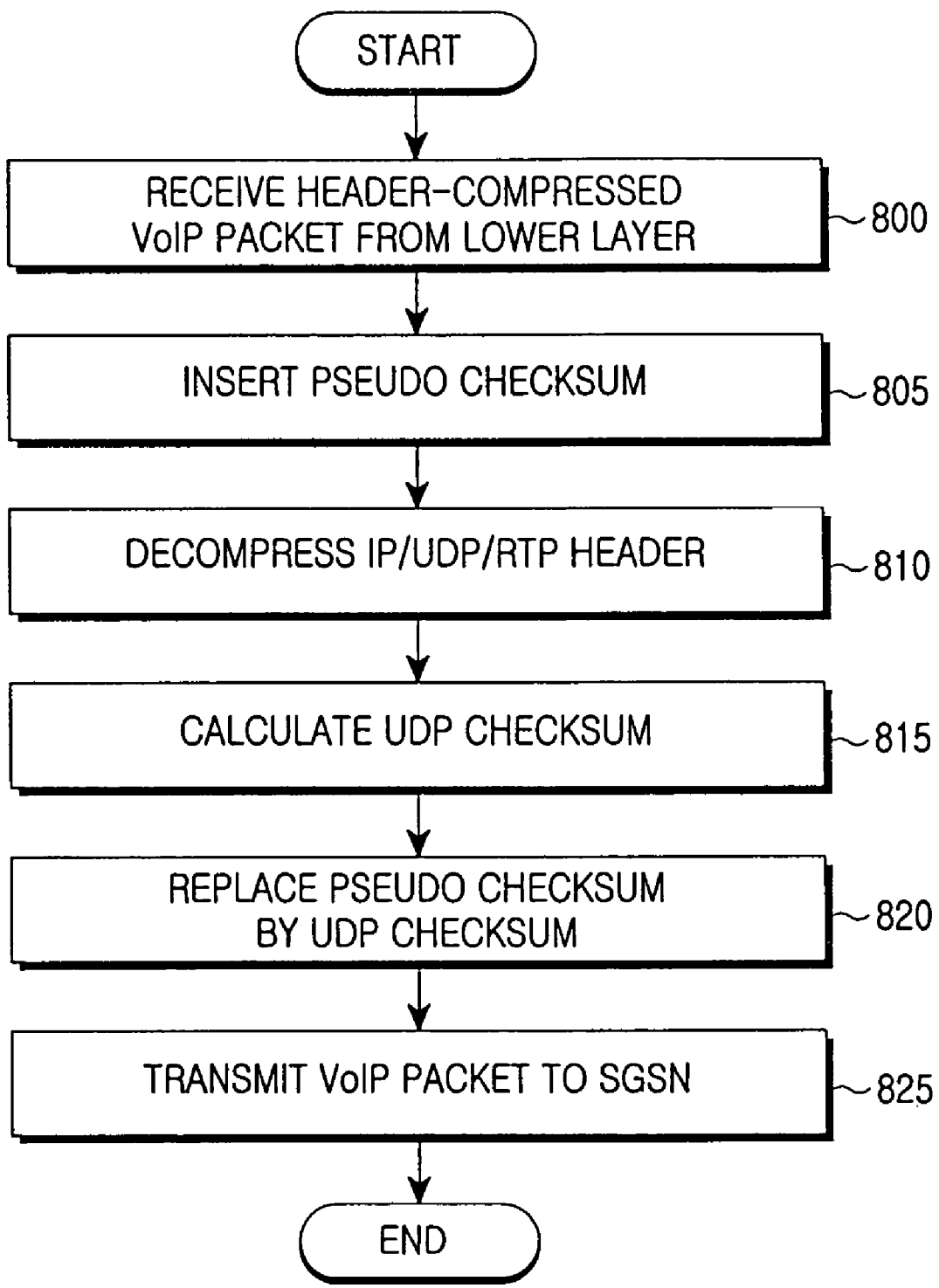
FIG. 8 is a flowchart illustrating an exemplary PDCP layer operation of the RNC for uplink VoIP packet reception according to an exemplary embodiment of the present invention.

FIG. 8 is a flowchart illustrating an exemplary PDCP layer operation of the RNC for the uplink reception according to an exemplary embodiment of the present invention.

Referring to FIG. 8, the RNC receives a header-compressed VoIP packet from the lower layer in step 800. In step 805, the RNC inserts a predetermined pseudo checksum into the VoIP packet.

The RNC then decompresses the IP/UDP/RTP header of the VoIP packet with the pseudo checksum in step 810. In step 815, the RNC calculates the UDP checksum of the header-decompressed VoIP packet in the same manner as done by the UDP. The RNC substitutes the UDP checksum for the pseudo checksum in the header-decompressed VoIP packet in step 820 and delivers the resulting VoIP packet to the SGSN in step 825.

In accordance with the exemplary embodiments of the present invention as described above, the use of a pseudo UDP checksum at both a transmitter and a receiver obviates the need for transmitting a UDP Checksum field. Therefore, transmission resources are saved.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of transmitting a voice over Internet protocol (VoIP) packet on a radio link in a mobile communication system which provides a voice service over a packet network connected to the Internet, comprising the steps of:
   receiving, from an upper layer, a VoIP packet containing a user datagram protocol (UDP) checksum field, a UDP checksum in the UDP checksum field being determined based on the VoIP packet;
   replacing the UDP checksum in the UPD checksum field with a pseudo checksum, the replaced pseudo checksum being preset between a transmitter and a receiver;
   compressing the header of the VoIP packet except for the replaced pseudo checksum in the UDP checksum field;
   eliminating the UDP checksum field from the header-compressed VoIP packet; and
   adding a cyclic redundancy check (CRC) to the UDP checksum field-free VoIP packet, for error detection in the radio link.

2. The method of claim 1 further comprising:
   transmitting the VoIP packet having the CRC on the radio link.

3. The method of claim 1, wherein the pseudo checksum is determined at a call setup.

4. The method of claim 1, wherein the received VoIP packet comprises an Internet protocol (IP) header, a UDP header with the UDP checksum field, a realtime transport protocol (RTP) header, and payload.

5. The method of claim 4, wherein the UDP checksum field provides the UDP checksum for detecting transmission errors in a pseudo header being part of the IP header, the UDP header, the RTP header, and the payload.

6. A method of receiving a voice over Internet protocol (VoIP) packet on a radio link in a mobile communication system which provides a voice service over a packet network connected to the Internet, comprising the steps of:
   receiving a VoIP packet without a user datagram protocol (UDP) checksum field on a radio link;
   inserting a pseudo checksum into the received VoIP packet, the inserted pseudo checksum being preset between a transmitter and a receiver;
   decompressing the header of the VoIP packet with the inserted pseudo checksum and calculating a UDP checksum for the header-decompressed VoIP packet; and
   replacing the pseudo checksum with the calculated UDP checksum in the head-decompressed VoIP packet.

7. The method of claim 6, wherein the pseudo checksum is determined at a call setup.

8. The method of claim 6, wherein the received VoIP packet comprises an Internet protocol (IP) header, a UDP header without the UDP checksum field, a realtime transport protocol (RTP) header, and payload.

9. The method of claim 6, wherein the calculated UDP checksum is a checksum for detecting transmission errors in a pseudo header being part of the IP header, the UDP header, the RTP header, and the payload.

10. An apparatus for transmitting a voice over Internet Protocol (VoIP) packet on a radio link in a mobile communication system which provides a voice service over a packet network connected to the Internet, comprising:
   a checksum inserter for receiving, from an upper layer, a VoIP packet containing a header comprising a user datagram protocol (UDP) checksum field, a UDP checksum in the UDP checksum field being determined based on the VoIP packet and replacing the UDP checksum in the UDP checksum field of the VoIP packet with a pseudo checksum, the replaced pseudo checksum being preset between a transmitter and a receiver;
   a header compressor for compressing the header of the VoIP packet except for the replaced pseudo checksum in the UDP checksum field;
   a checksum deleter for eliminating the UDP checksum field from the header-compressed VoIP packet; and
   a radio protocol (RP) transmitter for adding a cyclic redundancy check (CRC) to the UDP checksum field-flee VoIP packet, for error detection in the radio link.

11. The apparatus of claim 10, wherein the RP transmitter transmits the VoIP packet having the CRC on the radio link.

12. The apparatus of claim 10, wherein the received VoIP packet comprises an Internet protocol (IP) header, a UDP header with the UDP checksum field, a realtime transport protocol (RTP) header, and payload.

13. The apparatus of claim 10, wherein the pseudo checksum is determined at a call setup.

14. The apparatus of claim 12, wherein the UDP checksum field provides the UDP checksum for detecting transmission errors in a pseudo header being part of the IP header, the UDP header, the RTP header, and the payload.

15. An apparatus for receiving a voice over Internet protocol (VoIP) packet on a radio link in a mobile communication system which provides a voice service over a packet network connected to the Internet, comprising:

a radio protocol (RP) receiver for receiving a VoIP packet without a user datagram protocol (UDP) checksum field on a radio link;

a checksum inserter for inserting a pseudo checksum, the inserted pseudo checksum being preset between a transmitter and a receiver;

a header decompressor for decompressing the header of the VoIP packet with inserted the pseudo checksum; and a checksum calculator for calculating a UDP checksum for the header-decompressed VoIP packet and replacing the pseudo checksum with the calculated UDP checksum.

16. The apparatus of claim 15, wherein the received VoIP packet comprises an Internet protocol (IP) header, a UDP header without the UDP checksum field, a realtime transport protocol (RTP) header, and payload.

17. The apparatus of claim 15, wherein the pseudo checksum is determined at a call setup.

18. The apparatus of claim 16, wherein the UDP checksum field provides the UDP checksum for detecting transmission errors in a pseudo header being part of the IP header, he UDP header, the RTP header, and the payload.

* * * * *